United States Patent
Kai et al.

(10) Patent No.: US 10,029,605 B2
(45) Date of Patent: Jul. 24, 2018

(54) LIGHTING DEVICE, MOBILE OBJECT, AND SUPPORT

(71) Applicant: Panasonic Intellectual Property Management Co., Ltd., Osaka (JP)

(72) Inventors: Makoto Kai, Kyoto (JP); Tomoyuki Ogata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 90 days.

(21) Appl. No.: 15/061,344

(22) Filed: Mar. 4, 2016

(65) Prior Publication Data

US 2016/0264040 A1 Sep. 15, 2016

(30) Foreign Application Priority Data

Mar. 11, 2015 (JP) ................... 2015-048716

(51) Int. Cl.
| | | |
|---|---|---|
| *F21V 19/02* | (2006.01) | |
| *F21V 21/14* | (2006.01) | |
| *B60Q 1/04* | (2006.01) | |
| *B60Q 1/068* | (2006.01) | |
| *B60Q 1/20* | (2006.01) | |

(52) U.S. Cl.
CPC ......... *B60Q 1/0483* (2013.01); *B60Q 1/0433* (2013.01); *B60Q 1/0683* (2013.01); *B60Q 1/20* (2013.01); *B60Q 2200/32* (2013.01)

(58) Field of Classification Search
CPC .. B60Q 1/0425; B60Q 1/0433; B60Q 1/0441; B60Q 1/045; B60Q 1/0483; B60Q 1/06; B60Q 1/068; B60Q 1/0683; B60Q 1/0686; B60Q 1/20

USPC .................. 362/418–428, 523, 528–529
See application file for complete search history.

(56) References Cited

U.S. PATENT DOCUMENTS

| | | | |
|---|---|---|---|
| 6,746,142 B2 | 6/2004 | Shirai | |
| 6,871,989 B2* | 3/2005 | Nakazawa | B60Q 1/0683 362/289 |
| 2002/0085385 A1 | 7/2002 | Shirai | |
| 2016/0076757 A1* | 3/2016 | Seki | F21S 48/1742 362/524 |

FOREIGN PATENT DOCUMENTS

| | | |
|---|---|---|
| JP | 2002-193023 A | 7/2002 |
| JP | 2013-082430 A | 5/2013 |

* cited by examiner

*Primary Examiner* — Jason Moon Han
(74) *Attorney, Agent, or Firm* — McDermott Will & Emery LLP

(57) ABSTRACT

A lighting device for use with a mobile object includes a lamp having a through-hole, a lamp mount for fixing a lamp to a vehicle body, and a support that is shaft shaped and supports the lamp in a predetermined attitude relative to the lamp mount. The lamp mount has an insertion hole through which the support is to be inserted. The support includes, at the leading end side in the axial direction, a male threaded section to be inserted in the through-hole and, at the trailing end side in the axial direction, a trunk section having approximately the same diameter as the diameter of the insertion hole. The trunk section includes a communication portion that communicatively connects the leading end side and the trailing end side of the trunk section.

20 Claims, 10 Drawing Sheets

LIGHTING DEVICE, MOBILE OBJECT, AND SUPPORT

CROSS REFERENCE TO RELATED APPLICATION

This application claims the benefit of priority of Japanese Patent Application Number 2015-048716 filed on Mar. 11, 2015, the entire content of which is hereby incorporated by reference.

BACKGROUND

1. Technical Field

The present disclosure relates to a lighting device, a mobile object that includes the lighting device, and a support used in the lighting device.

2. Description of the Related Art

Vehicles are equipped with lighting devices such as headlamps and fog lamps in the front. Lighting devices include a lamp and an aiming screw for adjusting the optical axis of the lamp (e.g., see Japanese Unexamined. Patent Application Publication No. 2013-82430).

SUMMARY

With the above conventional lighting device, however, there is a problem that water accumulates around the lamp. The accumulated water may enter the lamp, causing the lamp to fog up, for example.

In view of this, one object of the present disclosure is to provide a lighting device that inhibits the accumulation of water around the lamp.

In order to achieve the object described above, a lighting device according to one aspect of the present disclosure is for use with a mobile object and includes a lamp, a lamp mount for fixing the lamp to the mobile object, and a support that is shaft shaped and supports the lamp in a predetermined attitude relative to the lamp mount. The lamp mount has an insertion hole through which the support is to be inserted. The support includes a male threaded section located at a leading end side in an axial direction, a trunk section located at a trailing end side in the axial direction. The male threaded section is to be inserted into a hole section fixed to the lamp. The trunk section has approximately the same diameter as a diameter of the insertion hole and includes a communication portion that communicatively connects the leading end side and the trailing end side of the trunk section.

Moreover, a mobile object according to one aspect of the present disclosure includes the lighting device described above.

Moreover, a support according to one aspect of the present disclosure has a shaft shape and includes a male threaded section located at a leading end side in an axial direction, and a trunk section located at a trailing end side in the axial direction. The trunk section has a larger diameter than the male threaded section and includes a communication portion that communicatively connects the leading end side and the trailing end side of the trunk section.

According to the present disclosure, accumulation of water around the lamp can be inhibited.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF EMBODIMENT(S)

Figure 1:
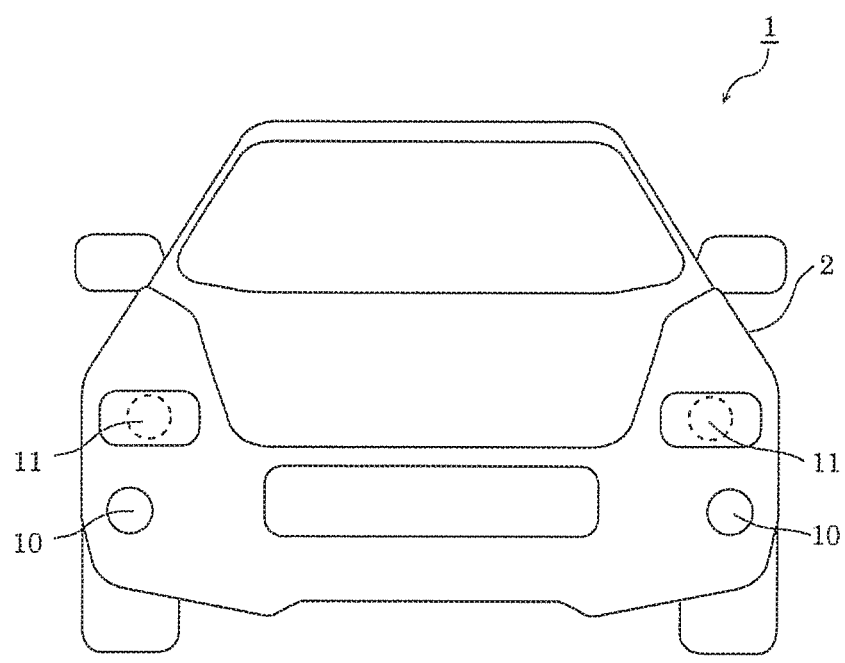
FIG. 1 is an exemplary front view of an automobile according to an embodiment of the present disclosure.

The following describes a lighting device, mobile object, and support according to an embodiment of the present disclosure with reference to the drawings. Note that the embodiment described below shows a specific example of the present disclosure. The numerical values, shapes, materials, elements, the arrangement and connection of the elements, and others indicated in the following embodiment are mere examples, and therefore do not intend to limit the inventive concept. Therefore, among the elements in the following embodiment, elements not recited in any of the independent claims defining the most generic part of the inventive concept are described as arbitrary elements.

As described herein, "front" and "forward" refer to the direction in which light is emitted from the lighting device (i.e., the light-emitting direction) and the light-extraction direction in which light is extracted (i.e., the lighting direction), and "back" and "rearward" refer to the direction opposite the direction to which "front" and "forward" refer. Moreover, "front" and "forward" refer to the direction of travel when the automobile moves forward, "right" and "left" are from the perspective of the driver of the automobile when facing forward, "up" refers to the direction toward the ceiling of the automobile, and "down" and "downward" refer to the direction opposite the direction to which "up" refers.

The Y axis corresponds to the front and back directions, the Z axis corresponds to the up and down (vertical) directions, and the X axis corresponds to the left and right (horizontal, lateral) directions. In other words, in the following embodiment, the predetermined lighting direction refers to the direction in which the lighting device projects light, i.e., "forward", i.e., the positive direction of the Y axis.

Note that the drawings are represented schematically and are not necessarily precise illustrations. Additionally, like elements share like reference numbers in the drawings. Also note that the term "approximately", such as in "approximately the same", is used throughout the specification. Here, in addition to meaning exactly the same, "approximately the same" means, for example, essentially the same, i.e., includes deviations of about a few percent. This applies to other phrases where "approximately" is used as well.

Embodiment

Automobile

First, automobile 1 according to an embodiment of the present disclosure will be described with reference to FIG. 1. FIG. 1 is a front view of automobile 1 according to an embodiment of the present disclosure.

As illustrated in FIG. 1, automobile 1 according to this embodiment is one example of a mobile object, such as a four-wheeled automobile, and includes vehicle body (vehicle) 2, lighting devices 10 disposed on the left and right sides of the front of vehicle body 2, and headlamps 11 disposed on the left and right sides of the front of vehicle body 2. Automobile 1 is, for example, an automobile propelled by a gasoline engine or an automobile propelled by an electric motor.

Headlamp 11 is one example of a lighting device for use with the mobile object and is, for example, a headlight (vehicle headlamp) that is installed, on vehicle body 2. Headlamps 11 are mainly used at night and project light forward.

Lighting device 10 is one example of the lighting device for use with the mobile object, and is, for example, a fog lamp that is installed on vehicle body 2. Lighting devices 10 are used as auxiliary lamps to headlamps 11.

Lighting Device

Lighting device 10 according to this embodiment will be described with reference to FIG. 2 through FIG. 7.

Figure 2:
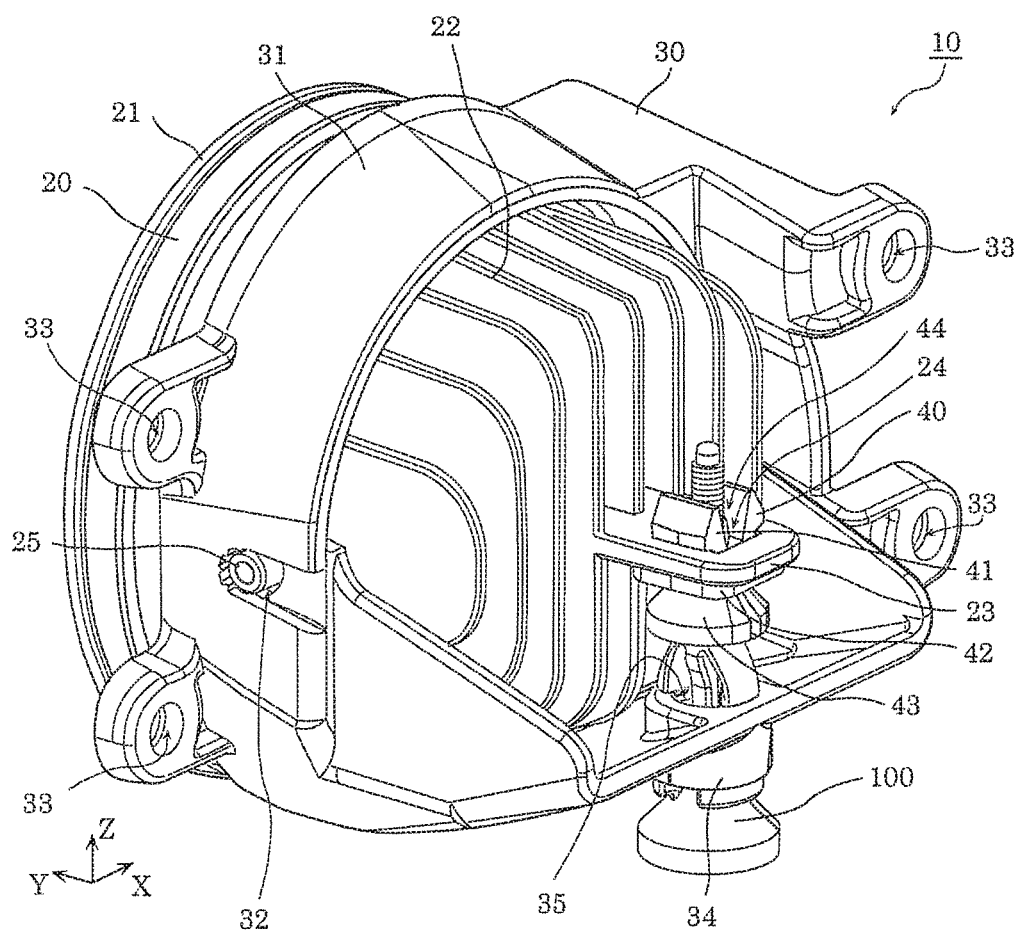
FIG. 2 is an exemplary perspective view of a lighting device according to an embodiment of the present disclosure.
Figure 3:
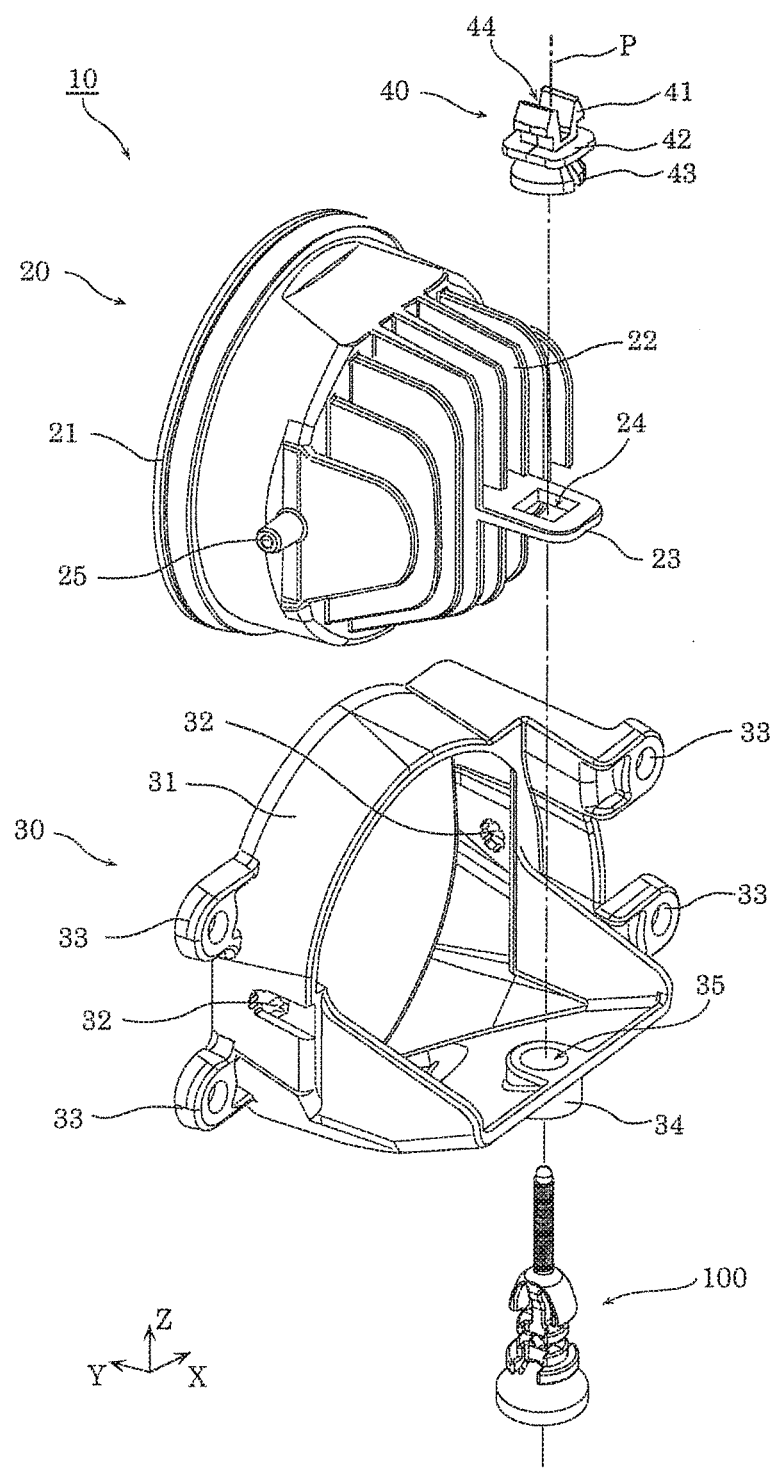
FIG. 3 is an exemplary exploded perspective view of a lighting device according to an embodiment of the present disclosure.
Figure 4:
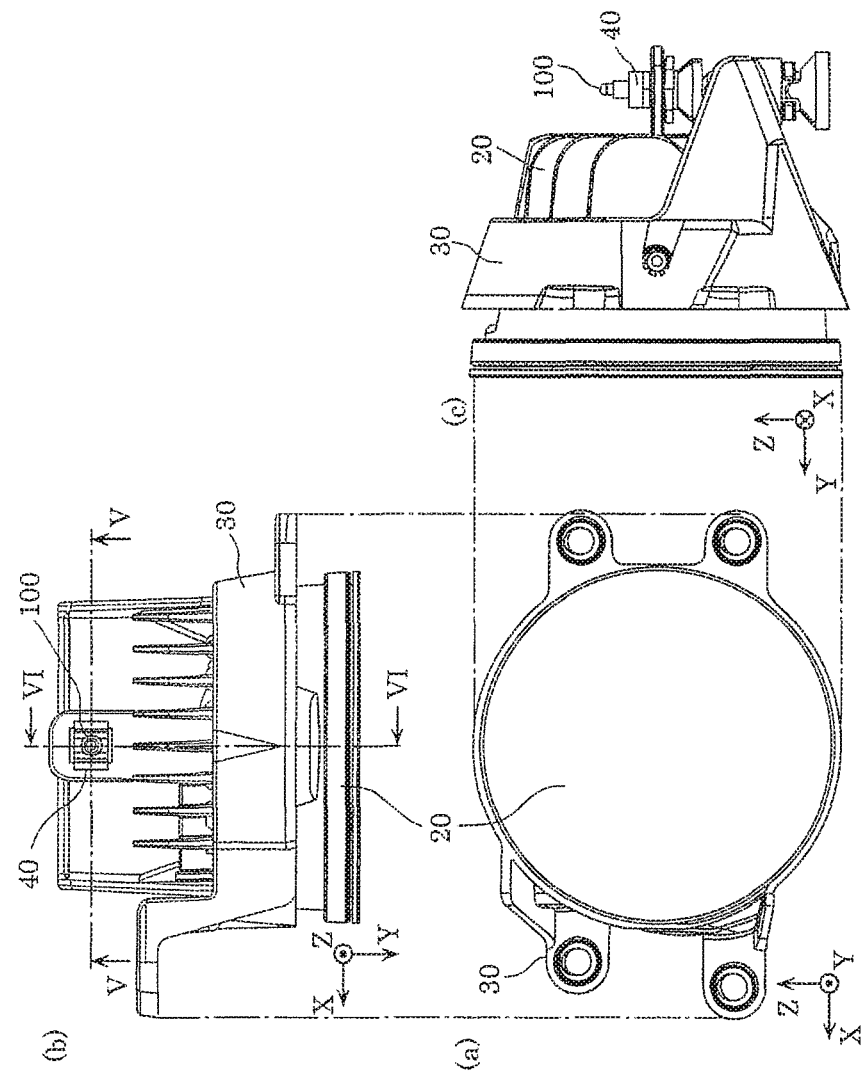
FIG. 4 illustrates three different exemplary views of a lighting device according to an embodiment of the present disclosure.

FIG. 2 is a perspective view of lighting device 10 according to this embodiment. FIG. 3 is an exploded perspective view of lighting device 10 according to this embodiment. FIG. 4 illustrates three different views of lighting device 10 according to this embodiment. More specifically, (a) in FIG. 4 is a front view of lighting device 10, (b) in FIG. 4 is a top view of lighting device 10, and (c) in FIG. 4 is a right side view of lighting device 10.

Figure 5:
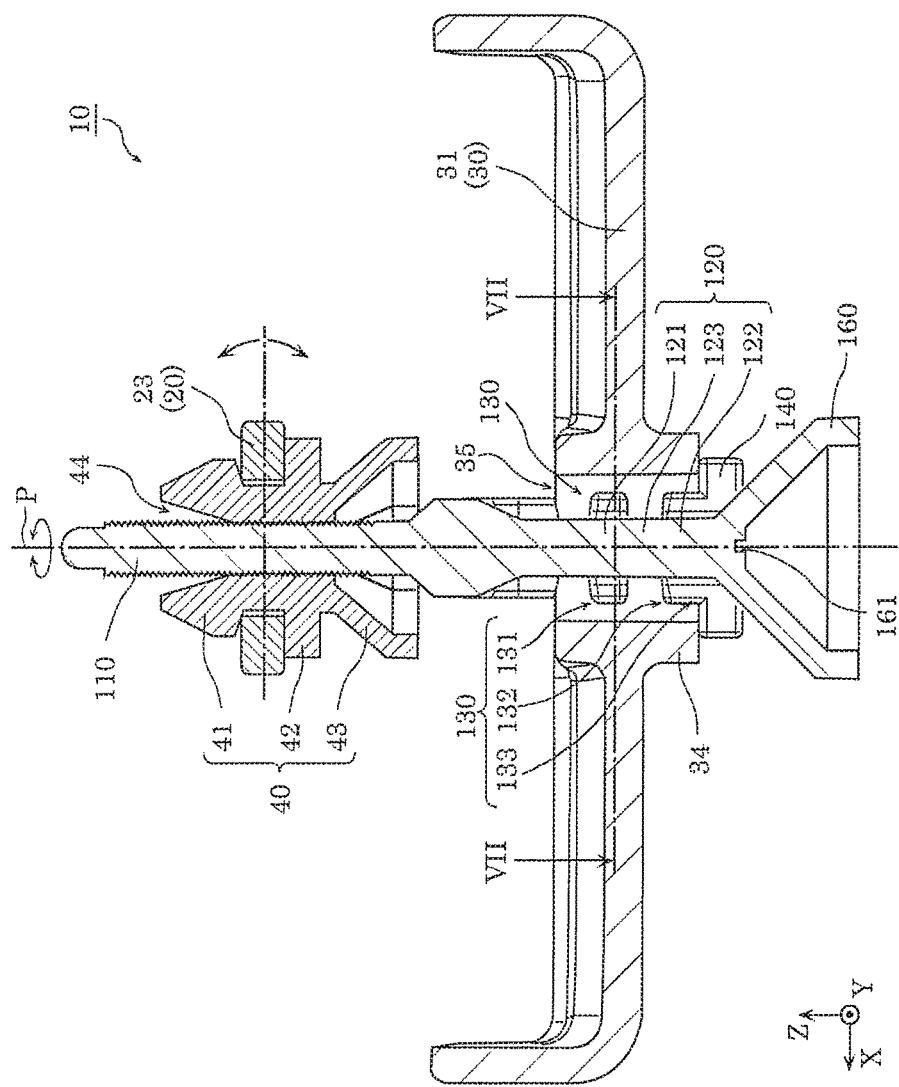
FIG. 5 is a cross sectional view of a lighting device according to an embodiment of the present disclosure, taken along line V-V in FIG. 4.
Figure 6:
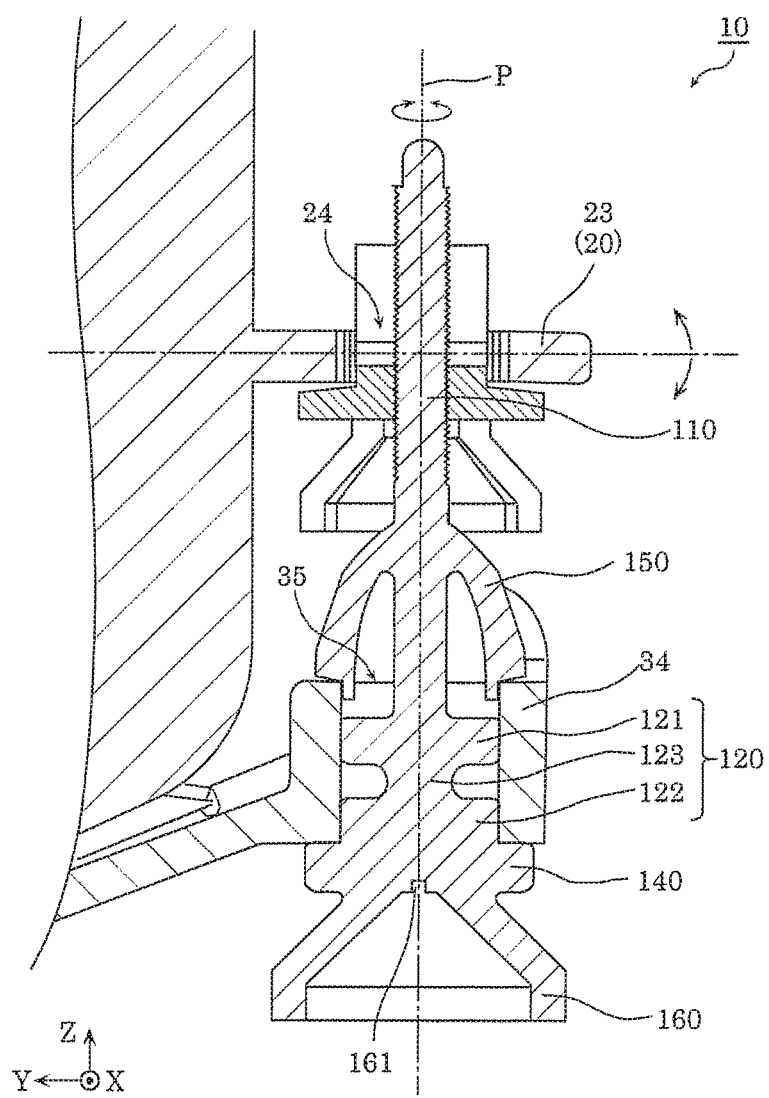
FIG. 6 is a cross sectional view of a lighting device according to an embodiment of the present disclosure, taken along line VI-VI in FIG. 4.
Figure 7:
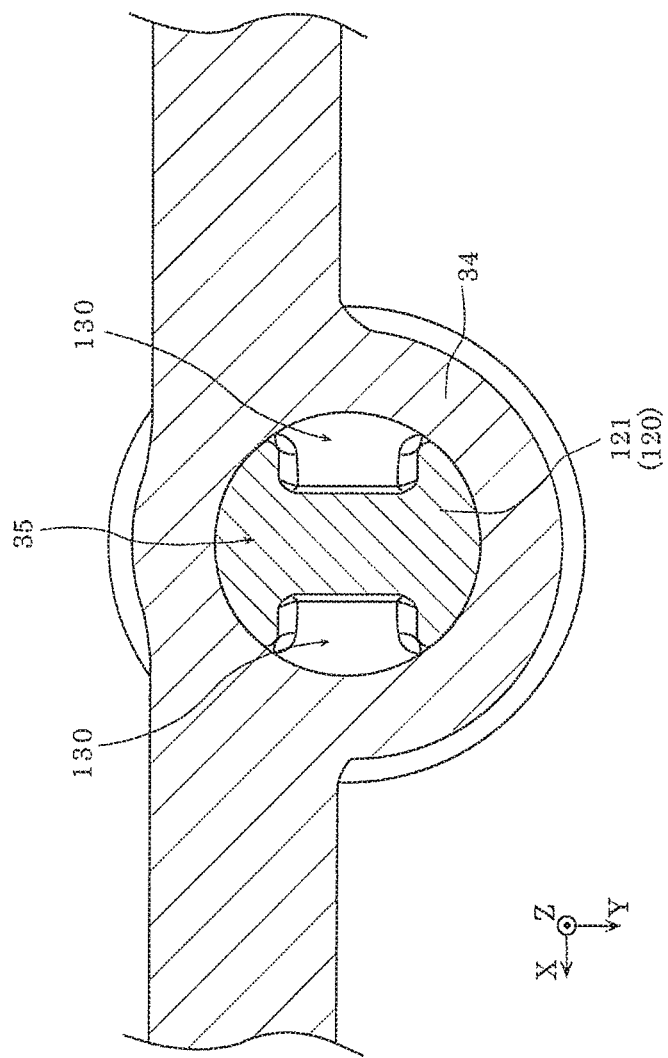
FIG. 7 is a cross sectional view of a lighting device according to an embodiment of the present disclosure, taken along line in FIG. 5.

FIG. 5 is a cross sectional view of lighting device 10 according to this embodiment, taken along line V-V in FIG. 4. FIG. 6 is a cross sectional view of lighting device 10 according to this embodiment, taken along line VI-VI in FIG. 4. FIG. 7 is a cross sectional view of lighting device 10 according to this embodiment, taken along line VII-VII in FIG. 5.

As illustrated in FIG. 2 through FIG. 4, lighting device 10 includes lamp 20, lamp mount 30, optical axis adjuster 40, and support 100.

Hereinafter, each element included in lighting device 10 will be described in detail.

Lamp

Lamp 20 is the main body of lighting device 10, and includes a light source (not illustrated in the Drawings) that emits illuminating light. The light source is, for example, a light source including light-emitting elements such as LEDs.

As illustrated in FIG. 3, lamp 20 includes light-transmissive cover 21, housing 22, first protrusion 23, through-hole 24, and second protrusion 25.

Light-transmissive cover 21 has light transmitting properties, is fixed to housing 22, and protects the light source housed inside housing 22. Light-transmissive cover 21 is made from, for example, a light-transmissive resin material. Light emitted, by the light source is extracted out of lamp 10 by passing through light-transmissive cover 21. In other words, the front surface of light-transmissive cover 21 is the surface through which light exits. This surface of light-transmissive cover 21 has, for example, an approximately circular, approximately plate-like shape.

Housing 22 houses the light source. Housing 22 has the shape of an approximately cylindrical tube having an approximately circular opening and base section. Light-transmissive cover 21 is attached to the front surface (opening) of housing 22. First protrusion 23 is provided on the back portion of housing 22. Second protrusions 25 are provided on side portions of housing 22. More specifically, one second protrusion 25 is provided on the right side of housing 22, and another second protrusion 25 is provided on the left side of housing 22.

Housing 22 also functions as a heat sink. More specifically, as illustrated in FIG. 2, a plurality of fins are provided on the back portion of housing 22. In order to increase heat dissipation efficiency, housing 22 is made from, for example, a metal material having a high rate of heat transfer. For example, housing 22 is made from die-cast aluminum alloy.

First protrusion 23 is a plate-shaped protrusion extending rearward (in the negative direction of the Y axis) from the back portion of housing 22. Through-hole 24 is formed in first protrusion 23, opening through in a direction (Z axis direction) perpendicular to the optical axis (Y axis) of lamp 20.

Through-hole 24 is provided for the purpose of attaching optical axis adjuster 40. Optical axis adjuster 40 fits into through-hole 24. Through-hole 24 has a shape that matches the shape of optical axis adjuster 40, and in this embodiment, has an approximately rectangular opening.

Second protrusions 25 protrude outward from side portions of housing 22. Second protrusions 25 each have, for example, the shape of a column or tube, and in this embodiment, has the shape of a cylindrical column or cylindrical tube. Second protrusions 25 are to be inserted in support holes 32 of lamp mount 30.

Note that housing 22, first protrusion 23, and second protrusions 25 are, for example, integrally formed. In other words, first protrusion 23 and second protrusions 25 are, for example, parts of housing 22. Through-hole 24 may be, for example, formed integrally with housing 22, or added, to housing in a separate process.

Lamp 20 is supported at three points: the two second protrusions 25 and one first protrusion 23. More specifically, lamp 20 is fixed in a predetermined attitude as a result of the two second protrusions 25 of lamp 20 being inserted in the two support holes 32 in lamp mount 30, and optical axis adjuster 40 fitted in through-hole 24 being supported by support 100.

Although not illustrated in the Drawings, lamp 20 (more specifically, housing 22) includes a hole that fluid communicatively connects the inside of lamp 20 with the outside. Since the air in lamp 20 expands from the heat generated by the light source when the light source is on, this hole is provided as a vent hole for allowing air to escape out of lamp 20. It is through this hole that water enters lamp 20.

Lamp Mount

Lamp mount 30 is a component (bracket) for fixing lamp 20 to vehicle body 2. Lamp mount 30 is to be fixed to vehicle body 2. Support 100 fixes lamp 20 to lamp mount 30 in a predetermined position. As illustrated in FIG. 3, lamp mount 30 includes main body 31, support holes 32, attachment holes 33, cylindrical tube part 34, and insertion hole 35.

Main body 31 is a frame-like component that covers the side surfaces of lamp 20. Main body 31 includes two support holes 32, one on the left side and the other on the right side. Main body 31 supports lamp 20 as a result of lamp 20 being inserted into main body 31 from the front and second protrusions 25 of lamp 20 being inserted in support holes 32.

Support holes 32 are holes into which second protrusions 25 of lamp 20 are to be inserted. Lamp 20 is supported so as to be rotatable about a line passing through the two support holes 32 as an axis. More specifically, lamp 20 can be rotated within a predetermined range about a line passing through two the support holes 32 as an axis by adjusting how far support 100 is inserted into through-hole 24 of lamp 20. This configuration makes it possible to adjust the optical axis of lamp 20.

Attachment holes 33 are for inserting fasteners such as screws or bolts upon attaching lamp mount 30 to vehicle body 2. In this embodiment, lamp mount 30 includes four attachment holes 33. However, the number of attachment holes 33 is not limited to this example, and may be any number that allows lamp mount 30 to be fixed to vehicle body 2.

Cylindrical tube part 34 forms insertion hole 35. Cylindrical tube part 34 is a cylindrical tube having a predetermined height and a predetermined thickness. The height (in a Z axis direction) of cylindrical tube part 34—i.e., the length of insertion hole 35—is, for example, approximately equal to the distance between hook 150 and restricting section 140 of support 100. The diameter of cylindrical tube part 34—i.e., the diameter of insertion hole 35—is approximately equal to the outer diameter of trunk section 120 of support 100.

Insertion hole 35 is a hole through which support 100 is to be inserted through. In this embodiment, insertion hole 35 is a collimated hole extending along the Z axis. Note that the dotted and dashed line in FIG. 3 indicates axis P of insertion hole 35. As illustrated in FIG. 3, axis p is parallel with the Z axis and passes through the approximate center of through-hole 24 of lamp 20.

Note that in this embodiment, through-hole 24 and insertion hole 35 for passing through support 100 are provided on the back portions of lamp 20 and lamp mount 30, respectively, but the locations of through-hole 24 and insertion hole 35 are not limited to this example. Through-hole 24 and insertion hole 35 may be provided on the side portions of lamp 20 and lamp mount 30, respectively. Moreover, a plurality of through-holes 24 and insertion holes 35 may be provided, in which case lamp 20 may be supported by a plurality of supports 100.

Optical Axis Adjuster

Optical axis adjuster 40 is a component to be fixed to through-hole 24 of lamp 20, for adjusting the optical axis of lamp 20. As illustrated in FIG. 3, optical axis adjuster 40 includes hook 41, restricting section 42, guide section 43, and through-hole 44.

Hook 41 is a hook (lance) for inhibiting optical axis adjuster 40 from failing out of through-hole 24 in a downward direction. Hook 41 is a part that, while optical axis adjuster 40 is inserted in through-hole 24, radially protrudes beyond the top opening of through-hole 24.

Restricting section 42 restricts optical axis adjuster 40 from moving with support 100 in the insertion direction of support 100 upon inserting support 100 in optical axis adjuster 40. More specifically, restricting section 42 is a flat, plate-like section having a shape in a top view that is larger than through-hole 24.

Guide section 43 has a tapered hole for guiding support 100 upon insertion of support 100. Guide section 43 gradually decreases in diameter in the insertion direction of support 100. Guide section 43 has, for example, a conical inner side surface. Through-hole 44 is formed at the conical tip end of guide section 43.

Through-hole 44 is formed through hook 41 and restricting section 42 in the axial direction (Z axis direction). Male threaded section 110 of support 100 is to be inserted in through-hole 44. Relative positions of optical axis adjuster 40 and support. 100 can be fixed by screwing together through-hole 44 and male threaded section 110. Hook 41 may have female threads formed on the surface defining through-hole 44. Accordingly, by changing the position of optical axis adjuster 40 relative to support 100, the optical axis of lamp 20 fixed to optical axis adjuster 40 can be changed.

Support

Next, support 100 according to this embodiment will be described in detail with reference to FIG. 8 and FIG. 9.

Figure 8:
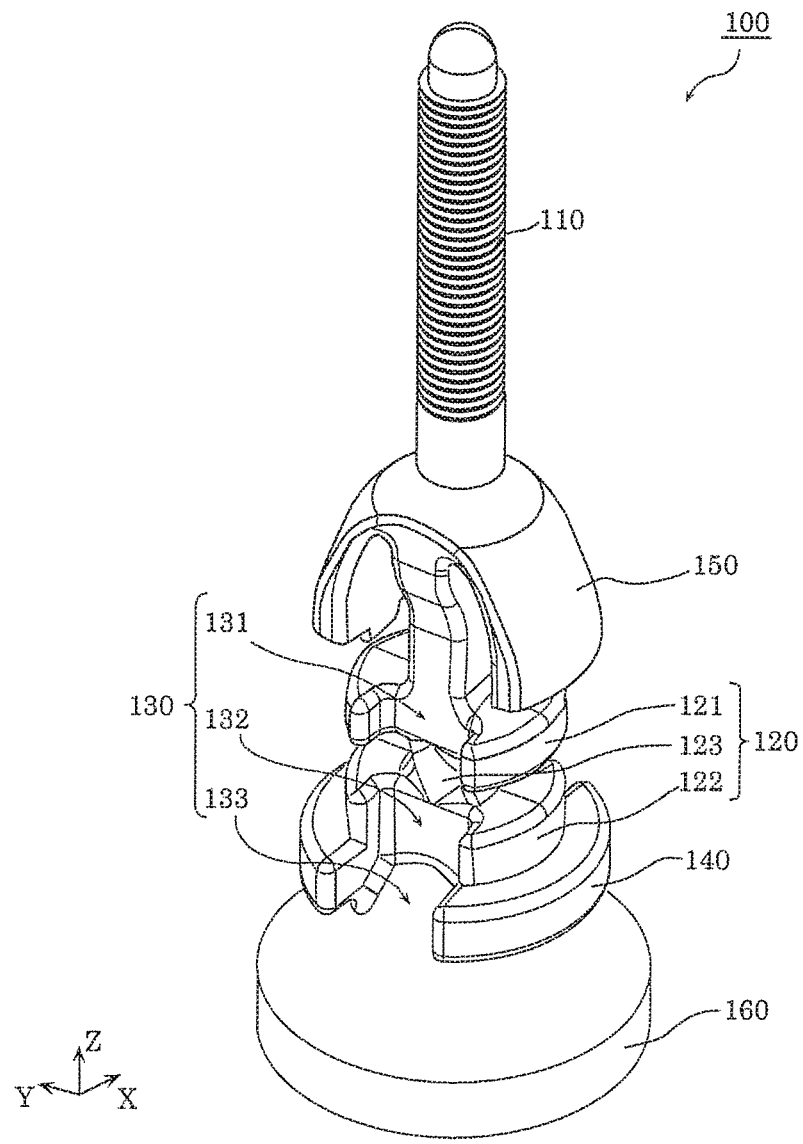
FIG. 8 is an exemplary perspective view of a support according to an embodiment of the present disclosure.

FIG. 8 is a perspective view of support 100 according to this embodiment. FIG. 9 illustrates three different views of support 100 according to this embodiment.

Support 100 is a shaft shaped support component that supports lamp 20 in a predetermined attitude relative to lamp mount 30. More specifically, support 100 is an aiming screw for adjusting the optical axis of lamp 20. As illustrated in FIG. 2, support 100 is inserted through insertion hole 35 of lamp mount 30 and fixed to lamp mount 30, inserted through through-hole 24 of lamp 20 fixed to lamp mount 30 via optical axis adjuster 40, and supports lamp 20. In this embodiment, the insertion direction (positive direction of the Z axis) of support 100 is referred to as the leading end side in the axial direction, and the opposite direction (negative direction of the Z axis) is referred to as the trailing end side in the axial direction.

Support 100 is formed by integral forming using a resin material such as Teflon™. Support 100 may alternatively be made of a metal material or a composite of a resin material and a metal material.

Figure 9:
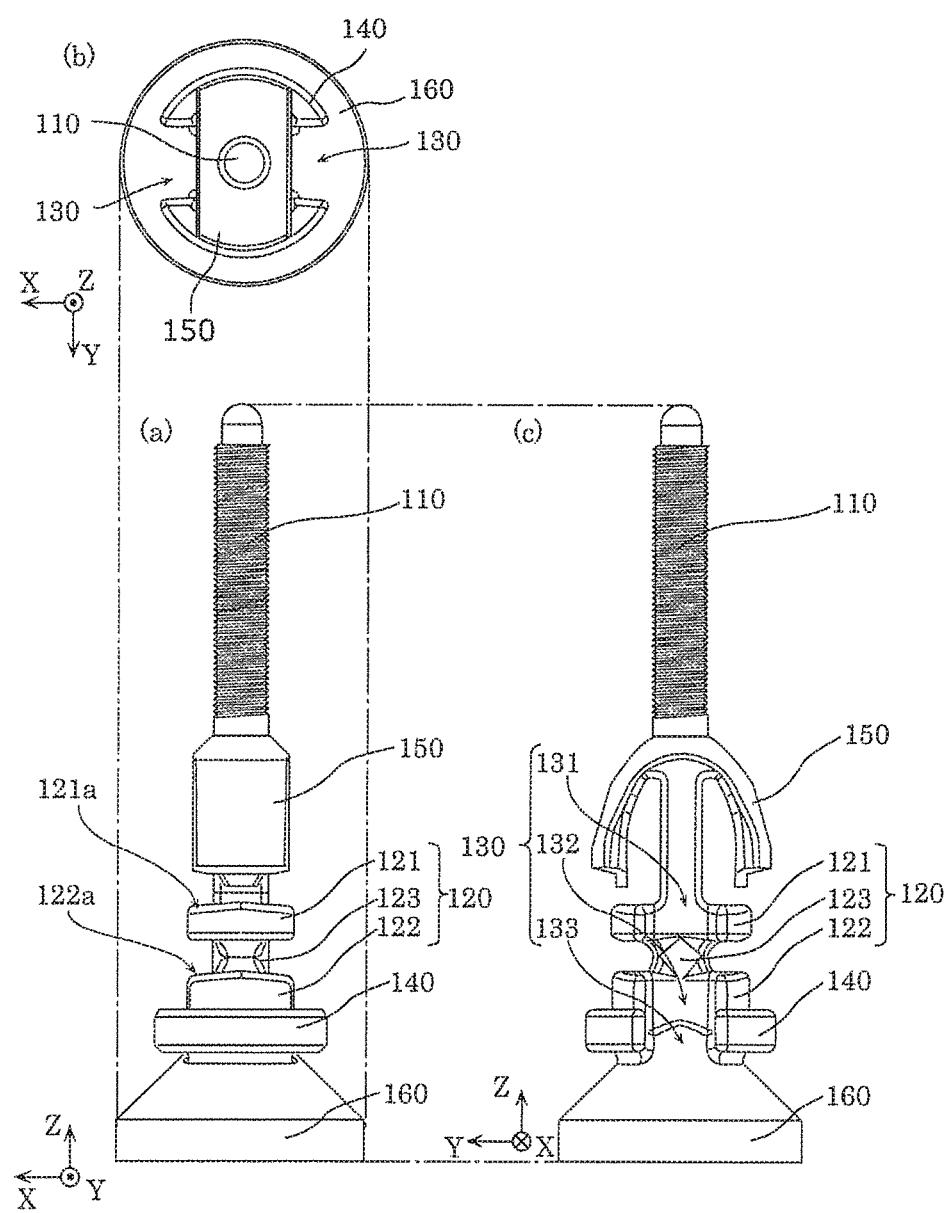
FIG. 9 illustrates three different exemplary views of a support according to an embodiment of the present disclosure.

As illustrated in FIG. 8 and FIG. 9, support 100 includes male threaded section 110, trunk section 120, communication portion 130, restricting section 140, hook 150, and guide section 160. Hereinafter, each element included in support 100 will be described in detail.

Male Threaded Section

Male threaded section 110 is located at the leading end side in the axial direction. The outer diameter of male threaded section 110 is approximately the same as the diameter of through-hole 44 of optical axis adjuster 40. Male threaded section 110 adjusts the incline of the optical axis of lamp 20 by screwing in and out of through-hole 44. This is described in detail below.

Support 100 is fixed to lamp mount 30. More specifically, as illustrated in FIG. 6, support hook 150 is in contact with the top surface of cylindrical tube part 34 and restricting section 140 is in contact with the bottom surface of cylindrical tube part 34, and thereby vertical movement of support 100 is restricted. In this state, rotating support 100 moves optical axis adjuster 40 vertically along the threads of male threaded section 110.

Here, as illustrated in FIG. 5 and FIG. 6, since optical axis adjuster 40 is fixed to through-hole 24 of lamp 20, lamp 20 moves vertically with vertical movement of optical axis adjuster 40 by threaded section 110 (i.e., support 100). More specifically, lamp 20 rotates about a line passing through the two second protrusions 25 as an axis of rotation. Accordingly, the incline of the optical axis of lamp 20 can be vertically adjusted by rotating male threaded section 110 (i.e., support 100).

Trunk Section

Trunk section 120 is located at the trailing end side in the axial direction. The diameter of trunk section 120 is approximately the same as the diameter of insertion hole 35 of lamp mount 30. Trunk section 120 restricts movement of support 100 in directions perpendicular to the axial direction (i.e., in lateral directions).

Trunk section 120 has an approximately cylindrical shape. More specifically, trunk section 120 has the shape of an approximate cylinder with a channel (groove) extending along the side in the axial direction (the channel corresponds to communication portion 130) and a recess extending along the circumference. The recess extending along the circumference gives trunk section 120 an overall hourglass shape. More specifically, in this embodiment, trunk section 120 includes a leading-end-side first large diameter part 121, a trailing-end-side second large diameter part 122, and small diameter part 123, as illustrated in FIG. 8 and FIG. 9.

Trunk section 120 has a surface on the leading end side (i.e., a top surface) that inclines toward communication portion 130. For example, the angle of the incline is 5 degrees or more relative to a plane perpendicular to the axial direction (generally the horizontal plane). In this embodiment, since two communication portions 130 are formed, the top surface of trunk section 120 inclines so as to decrease in height from the midpoint between the two communication portions 130 in the circumferential direction toward each of the two communication portions 130.

In a cross section taken perpendicular to the axial direction, trunk section 120 has a fan shape that widens from the center outward. In other words, in a cross section taken perpendicular to the axial direction, trunk section 120 is shaped such that the area of contact of trunk section 120 and the wall of insertion hole 35 (i.e., the inner wall of cylindrical tube part 34) increases. That is to say, trunk section 120 is shaped so as to ease stress from the wall of insertion hole 35.

In this embodiment, trunk section 120 has to fan-shaped portions. More specifically, as illustrated in FIG. 7, in a cross section taken perpendicular to the axial direction, trunk section 120 has an approximately circular shape with approximately rectangular recessed portions (equivalent to communication portion 130) that recede from the outer perimeter toward the center, removed. In this embodiment, since two communication portions 130 are provided, trunk section 120 overall is hourglass shaped in a cross section taken perpendicular to the axial direction.

First large diameter part 121 is approximately a flat cylinder (a disk-like shape). First large diameter part 121 has a larger diameter than the diameter of male threaded section 110. More specifically, first large diameter part 121 has approximately the same diameter as the diameter of insertion hole 35. In other words, as illustrated in FIG. 6 and FIG. 7, the outer circumferential surface (side surface of the cylinder) of first large diameter part 121 is in close contact with the wall of insertion hole 35. As illustrated in (a) in FIG. 9, first large diameter part 121 has a surface on the leading end side (i.e., top surface 121a) that inclines so as to decrease in height toward each of the two first communication portions 131. With this, water flowing onto top surface 121a can smoothly flow into the two first communication portions 131.

First large diameter part 121 is approximately a flat cylinder (a disk-like shape), and includes two first communication portions 131. More specifically, in a cross section taken perpendicular to the axial direction, two channels are formed at opposite positions in the side surface of first large diameter part 121 as the two first communication portions 131. In other words, first large diameter part 121 overall is hour-glass shaped in a cross section taken perpendicular to the axial direction. The thickness (length in the axial direction) of first large diameter part 121 is, but not limited to, approximately 3 mm to 5 mm, for example.

Second large diameter part 122 is a flat, approximate cylinder. Second large diameter part 122 has a larger diameter than male threaded section 110. More specifically, second large diameter part 122 has approximately the same diameter as the diameter of insertion hole 35. In other words, as illustrated in FIG. 6, the outer circumferential surface (side surface of the cylinder) of second large diameter part 122 is in close contact with the wall of insertion hole 35. As illustrated in (a) in FIG. 9, second large diameter part 122 has a surface on the leading end side (i.e., top surface 122a) that inclines so as to decrease in height toward each of the two second communication portions 132. With this, water flowing in through first communication portion 131 can smoothly flow into the two second communication portions 132. The shape and size of second large diameter part 122 is the same as first large diameter part 121.

Small diameter part 123 has a smaller diameter than first large diameter part 121 (or second large diameter part 122). Small diameter part 123 has a smaller diameter than the diameter of insertion hole 35. Small diameter part 123 is located between first large diameter part 121 and second large diameter part 122. In other words, small diameter part 123 gives trunk section 120 its hourglass shape. As illustrated in FIG. 5, the radius of small diameter part 123 is approximately equal to the distance from the center of the shaft to the bottom surface of communication portion 130 (bottom of the channel). In other words, the side surface of small diameter part 123 and the bottom surface of communication portion 130 are approximately flush with each other. The thickness of small diameter part 123 is, for example, the same as first large diameter part 121.

Communication Portion

Communication portion 130 is formed in trunk section 120, and allows for communication between the leading end side and the trailing end side of trunk section 120. In this embodiment, communication portion 130 is a channel formed in the side surface of trunk section 120. Stated differently, communication portion 130 has the shape of a portion cut out of the side of trunk section 120.

Communication portion 130 is, for example, an approximately square channel having an approximately square opening in a cross section taken perpendicular to the axial direction, as illustrated in FIG. 7 and FIG. 8, but communication portion 130 is not limited to this example. For example, communication portion 130 may be U-shaped channel or a V-shaped channel. Alternatively, communication portion 130 may be a tapered channel whose width narrows with depth (toward the center of shaft). With this, trunk section 120 can be made to have an hourglass shape in a cross section taken perpendicular to the axial direction. Note that communication portion 130 is not required to be a channel; for example, communication portion 130 may be a through-hole opened through trunk section 120 in the axial direction.

Moreover, for example, the opening formed by communication portion 130 in the surface of trunk section 120 on the leading end side (i.e., the top surface) has an area, in a cross section taken perpendicular to the axial direction, of at least 9 mm². The opening of communication portion 130 has, for example, a 3 mm×3 mm approximately square shape. With this, water accumulated on the top surface due to vibrations in automobile 1 can drain smoothly via communication portion 130. Note that since a larger area opening of communication portion 130 makes it easier to drain water accumulated on the top surface, if the opening of communication portion 130 has, for example, a 5 mm×5 mm or greater approximately square shape, water drainage efficiency can be further increased.

In this embodiment, a plurality of communication portions 130 are provided. More specifically, as illustrated in FIG. 5 and FIG. 7, trunk section 120 includes two communication portions 130. The two communication portions 130 are, for example, symmetrically positioned about the axis of support 100 in a cross section taken perpendicular to the axial direction.

As illustrated in FIG. 8 and FIG. 9, communication portion 130 includes first communication portion 131, second communication portion 132, and third communication portion 133.

First communication portion 131 fluid-communicatively connects the leading end side and the trailing end side of first large diameter part 121. More specifically, first communication portion 131 is a channel (a groove) formed in the side surface of first large diameter part 121. First communication portion 131 is formed in a straight line along the axial direction.

Second communication portion 132 fluid-communicatively connects the leading end side and, the trailing end side of second large diameter part 122. The shape and size of second communication portion 132 is the same as first communication portion 131.

Third communication portion 133 fluid-communicatively connects the leading end side and the trailing end side of restricting section 140. Third communication portion 133 is a channel formed on the side surface of restricting section 140. The bottom of the channel is formed to be approximately flush with the bottom of second communication portion 132 (channel).

In this embodiment, communication portion 130 is formed in a straight line along the axial direction. More specifically, when viewed in the axial direction, first communication portion 131 and second communication portion 132 overlap. Even more specifically, as illustrated in FIG. 5, first communication portion 131 and second communication portion 132 are formed so as to be continuous vertically. With this, water passing through first communication portion 131 also passes through second communication portion 132. This allows for more smooth drainage of water.

Restricting Section

Restricting section 140 restricts support 100 from moving in the insertion direction of support 100 upon inserting support 100 in insertion hole 35. In other words, restricting section 140 prevents over-insertion of support 100.

Restricting section 140 is located to the trailing end side of trunk section 120 in the axial direction. Restricting section 140 is a flat, approximate cylinder, and has a larger diameter than the diameter of insertion hole 35 (i.e., than the diameter of trunk section 120). With this configuration, when support 100 is inserted through insertion hole 35, restricting section 140 restricts movement of support 100 in the insertion direction (positive direction of the Z axis). Restricting section 140 includes two third communication portions 133.

Hook

Hook 150 is a hook (lance) for inhibiting support 100 from falling out of insertion hole 35 in a downward direction. In this embodiment, hook 150 is located between male threaded section 110 and trunk section 120 and formed so as to not overlap with communication portion 130 in an extending direction of communication portion 130. The extending direction of communication portion 130 is, more specifically, the axial direction. In other words, when viewed in the axial direction, hook 150 does not overlap with communication portion 130.

Hook 150 is a protruding section protruding sideways from the side surface between male threaded section 110 and trunk section 120. More specifically, hook 150 protrudes diagonally downward from the side surface. With this configuration, a space is formed between hook 150 and the shaft portion (between male threaded section 110 and trunk section 120) of support 100.

Hook 150 has an approximately rectangular shape when viewed in the axial direction. More specifically, as illustrated in (b) in FIG. 9, when viewed in the axial direction, the long side of hook 150 is a straight line, and the short side is a circular arc. The long side of hook 150 is longer than the diameter of trunk section 120—that is to say, the diameter of insertion hole 35.

Using the spaces formed between the shaft portion, hook 150 deforms inward toward the shaft upon inserting support 100 through insertion hole 35. This allows trunk section 120 to be inserted in insertion hole 35. Moreover, while support 100 is inserted through insertion hole 35, hook 150 engages the top surface of cylindrical tube part 34. With this, support 100 can be inhibited from falling out of insertion hole 35.

Guide Section

Guide section 160 is a tapered hole that decreases in diameter in the axial direction, from the trailing end side toward screw head 161. Guide section 160, for example, guides the insertion of a tool for rotating support 100 (such as a screwdriver). Guide section 160 gradually decreases in diameter in the insertion direction of support 100 (i.e., in the positive direction of the Z axis). The inner surface of guide section 160 is, for example, a conical inner side surface. Screw head 161 is provided at the conical tip end of guide section 160.

Screw head 161 is located at the trailing end side in the axial direction. Screw head 161 has a groove or hole into which the leading end of a tool for rotating support 100 is to be inserted (for example, a cross shaped groove).

Advantageous Effects, Etc.

As described above, lighting device 10 according to this embodiment is for use with a mobile object, and includes: lamp 20; lamp mount 30 for fixing lamp 20 to vehicle body 2; and support 100 that is shaft shaped and supports lamp 20 in a predetermined attitude relative to lamp mount 30. Lamp mount 30 has insertion hole 35 through which support 100 is to be inserted. Support 100 includes male threaded section 110 located at the leading end side in the axial direction, and trunk section 120 located at the trailing end side in the axial direction. Male threaded section 100 is to be inserted into optical axis adjuster 40 fixed to lamp 20. Trunk section 120 has approximately the same diameter as the diameter of insertion hole 35, and includes communication portion 130 that communicatively connects the leading end side and the trailing end side of trunk section 120.

With this configuration, since communication portion 130 communicatively connects the leading end side and the trailing end side of trunk section 120, accumulation of water on the leading end, can be inhibited. In other words, even if water flows onto the surface of trunk section 120 on the leading end side (i.e., the top surface of trunk section 120), the water can drain to the trailing end side via communication portion 130. As a result, accumulation of water in the vicinity of support 100 can be inhibited. Water can therefore be inhibited from entering inside lamp 20, whereby fogging and such of the lamp and a reduction in the lifespan of the light source can be inhibited.

Moreover, drainage is not limited to water. For example, accumulation of solvents and such can be inhibited. This inhibits cracking of, for example, support 100 and lamp mount 30, from solvents. Thus, in addition to the lifespan of the light source, the mechanical lifespan of lighting device 10 can also be increased.

Moreover, for example, communication portion 130 is a channel formed in the side surface of trunk section 120.

With this configuration, accumulation of water on the top surface of trunk section 120 can be inhibited. For example, compared to when a through-hole is formed through trunk section 120 in the axial direction, since the channel has an opening with a larger area, water can drain more smoothly.

Moreover, for example, support 100 further includes hook 150 located between male threaded section 110 and trunk section 120. Hook 150 does not overlap with communication portion 130 in the extending direction of communication portion 130.

With this, support 100 inserted in insertion hole 35 can be inhibited from falling out. As a result, for example, the optical axis of lamp 20 can be inhibited from becoming misaligned.

Moreover, for example, trunk section 120 includes a plurality of communication portions 130.

With this configuration, accumulation of water on the top surface of trunk section 120 can be inhibited even further since a plurality of communication portions 130 are provided.

Moreover, for example, in a cross section taken perpendicular to the axial direction, trunk section 120 has a flared shape that widens from the center outward.

With this configuration, since trunk section 120 can press against the wall of insertion hole 35 (more specifically, the inner wall of cylindrical tube part 34) over a large surface area, lamp mount 30 can more securely hold support 100. Since this allows support 100 to withstand the shakiness of automobile 1 and securely hold lamp mount 30 for example, the optical axis of lamp 20 can be inhibited from becoming misaligned.

Moreover, for example, the surface of trunk section 120 on the leading end side inclines toward communication portion 130.

With this configuration, water that flows on the top surface of trunk section 120 can be smoothly directed to communication portion 130 and drained. As a result, accumulation of water on the top surface of trunk section 120 can be further inhibited.

Moreover, for example, the opening formed by communication portion 130 in the surface of trunk section 120 on the leading end side has an area of at least 9 mm$^2$.

With this configuration, water that flows on the top surface of trunk section 120 can smoothly drain to the trailing end side via communication portion 130. For example, water can smoothly drain via communication portion 130 by vibrations and such of automobile 1 when automobile 1 is being driven.

Moreover, for example, trunk section 120 includes first large diameter part 121 having approximately the same diameter as the diameter of insertion hole 35, second large diameter part 122 located to the trailing end side of first large diameter part 121 and having approximately the same diameter as the diameter of insertion hole 35, and small diameter part 123 located between first large diameter part 121 and second large diameter part 122 and having a smaller diameter than the diameter of insertion hole 35. Communication portion 130 includes first communication portion 131 that communicatively connects the leading end side and the trailing end side of first large diameter part 121, and second communication portion 132 that communicatively connects the leading end side and the trailing end side of second large diameter part 122. When viewed in the axial direction, first communication portion 131 and second communication portion 132 overlap one another.

Since this configuration gives trunk section 120 an hourglass shape, for example, the amount of material used to manufacture support 100 can be reduced, thereby reducing manufacturing costs. Moreover, when support 100 is made of a resin material, formation of sink marks can be inhibited with this configuration.

Moreover, for example, support 100 further includes: screw head 161 located at the trailing end side in the axial direction; and guide section 160 that decreases in diameter in the axial direction, from the trailing end side of guide section 160 toward screw head 161.

With this configuration, when a screwdriver, for example, is used to rotate support 100, the tapered hole can be used as a guide for the screwdriver. As a result, lighting device 10 can be attached to vehicle body 2 with ease, and the optical axis can adjusted with ease.

Moreover, for example, the mobile object according to this embodiment includes lighting device 10.

Moreover, for example, support 100 according to this embodiment is shaft shaped and supports lamp 20 in a predetermined attitude relative to lamp mount 30 for fixing lamp 20 to vehicle body 2. Lamp mount 30 has insertion hole 35 through which support 100 is to be inserted. Support 100 includes male threaded section 110 located at the leading end side in the axial direction, and trunk section 120 located at the trailing end side in the axial direction. Male threaded section 110 is to be inserted into optical axis adjuster 40 fixed to lamp 20. Trunk section 120 has approximately the same diameter as the diameter of insertion hole 35, and includes communication portion 130 that communicatively connects the leading end side and the trailing end side of trunk section 120.

Variation

Next, a variation of the support according to the above embodiment will be described with reference to the Drawings.

For example, with support 100 according to the above embodiment, communication portion 130 is exemplified as being formed in a straight line in the axial direction, but as this variation illustrates, communication portion 130 may be twisted.

Figure 10:
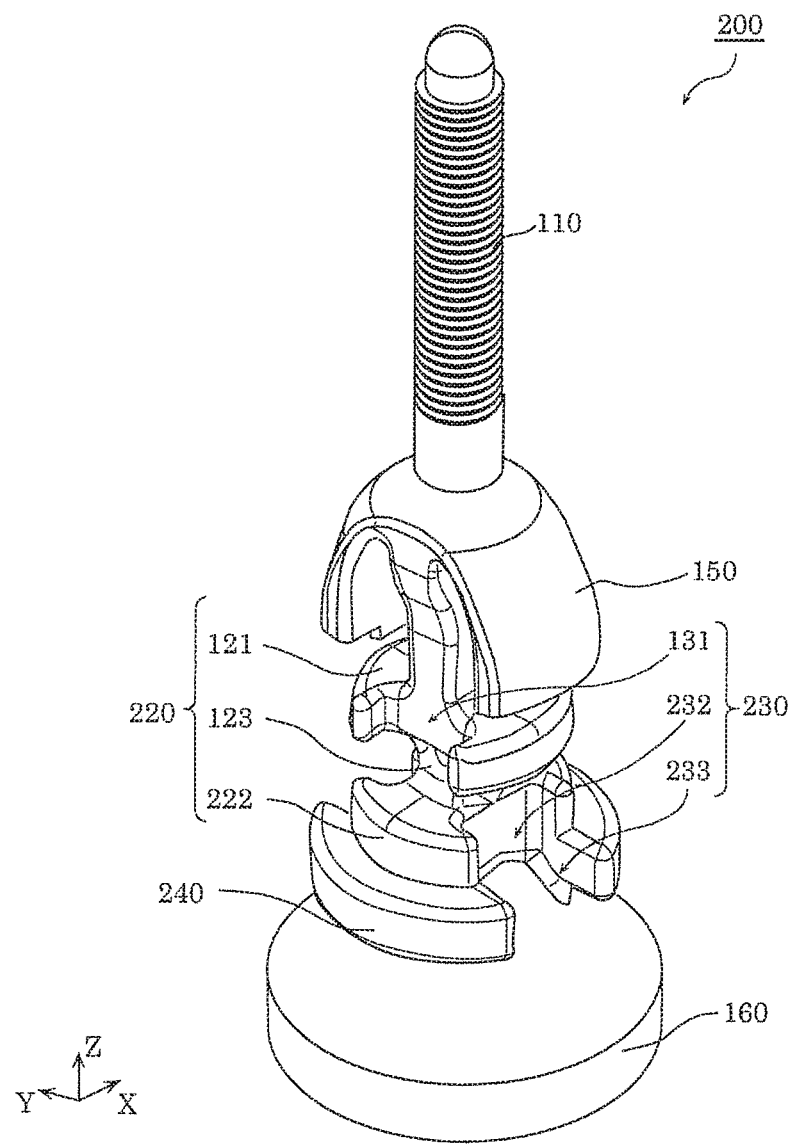
FIG. 10 is an exemplary perspective view of a support according to a variation of an embodiment of the present disclosure.

FIG. 10 is a perspective view of support 200 according to this variation.

As illustrated in FIG. 10, in contrast to support 100 according to the above embodiment, support 200 includes trunk section 220, communication portion 230, and restricting section 240 instead, of trunk section 120, communication portion 130, and restricting section 140. Note that the description hereinafter will focus on the points of difference with the above embodiment, and points of similarity will be omitted or condensed.

Trunk section 220 includes second large diameter part 222 instead of second large diameter part 122. Second large diameter part 222 includes second communication portion 232. Unlike the above embodiment, second communication portion 232 does not overlap with first communication portion 131 when viewed in the axial direction. In other words, when viewed in the axial direction, second communication portion 232 and first communication portion 131 are located in positions offset from one another. For example, second communication portion 232 is located in a position offset from first communication portion 131 by 90 degrees. More specifically, two first communication portions 131 are aligned along the X axis, and two second communication portions 232 are aligned along the Y axis.

Restricting section 240 includes third communication portion 233. When viewed in the axial direction, third communication portion 233 overlaps with second communication portion 232 and does not overlap with first communication portion 131. With this configuration, water can smoothly drain from second communication portion 232 to third communication portion 233.

Moreover, for example, communication portion 230 is twisted.

With this configuration, the rigidity of support 200 can be increased.

Moreover, for example, trunk section 220 includes first large diameter part 121 having approximately the same diameter as the diameter of insertion hole 35, second large diameter part 222 located to the trailing end side of first diameter part 121 and having approximately the same diameter as the diameter of insertion hole 35, and small diameter part 123 located between first large diameter part 121 and second large diameter part 222 and having a smaller diameter than the diameter of insertion hole 35. Communication portion 230 includes first communication portion 131 that communicative connects the leading end side and the trailing end side of first large diameter part 121, and second communication portion 232 that communicatively connects the leading end side and the trailing end side of second large diameter part 222. When viewed in the axial direction, first communication portion 131 and second communication portion 232 do not overlap one another.

With this configuration, since first communication portion 131 and second communication portion 232 do not overlap, the rigidity of support 200 can be increased. For example, in FIG. 10, first large diameter part 121 is resistant to stress in directions along the Y axis, and receptive to stress in directions along the X axis. In contrast, second large diameter part 222 is resistant to stress in directions along the X axis, and receptive to stress in directions along the Y axis. In this way, by forming first large diameter part 121 and second large diameter part 222 to complement one another, the overall rigidity of support 100 (trunk section 220) can be increased.

Other Variations

Although the lighting device, mobile object, and support according to the present disclosure have been described based on the above embodiment and variation thereof, the present disclosure is not limited to the above embodiment.

For example, in the above embodiment, lamp 20 is exemplified as including through-hole 24 for fixing optical axis adjuster 40 to lamp 20, but the configuration for fixing optical axis adjuster 40 and lamp 20 together is not limited to this example. For example, lamp 20 may sandwich and hold optical axis adjuster 40 with two protruding parts and, alternatively, optical axis adjuster 40 may be fixed to lamp 20 by inserting protruding parts of lamp 20 into holes opened in optical axis adjuster 40. The configuration for fixing optical axis adjuster 40 and lamp 20 together is not particularly limited to any specific configuration.

Moreover, for example, in the above embodiment, optical axis adjuster 40 and lamp 20 are separate components, but optical axis adjuster 40 and lamp 20 may be integrally formed (as a single component). Alternatively, optical axis adjuster 40 may be omitted from lighting device 10. For example, through-hole 24 of lamp 20 may have approximately the same diameter as the diameter of male threaded section 110 of support 100. In other words, support 100 may be directly inserted in through-hole 24 of lamp 20, and through-hole 24 and male threaded section 110 of support 100 may screw together. In this way, lamp 20 may include the hole section into which support 100 is to be inserted as a separate component (e.g., as optical axis adjuster 40) and, alternatively, the hole section may be formed integrally with lamp 20.

Moreover, for example, in the above embodiment, support 100 is exemplified as including restricting section 140, hook 150, and guide section 160, but the configuration of support 100 is not limited to this example. Support 100 is not required to include restricting section 140, hook 150, and guide section 160. For example, support 100 may include a claw section that protrudes from the sides of trunk section 120 instead of restricting section 140 and hook 150. Support 100 can be fixed to lamp mount 30 by engaging the claw section with a recess formed in the inner wall of cylindrical tube part 34 of lamp mount 30.

Moreover, for example, in the above embodiment, two communication portions 130 are provided, but one communication portion 130 or three or more communication portions 130 may be provided.

Moreover, for example, in the above embodiment, trunk section 120 is exemplified as overall being hourglass shaped (i.e., trunk section 120 is exemplified as including small diameter part 123), but the configuration of trunk section 120 is not limited to this example. Trunk section 120 may be a single cylindrical section.

Moreover, for example, in the above embodiment, lighting device 10 is exemplified as being a fog lamp, but lighting device 10 is not limited to this example. Lighting device may be headlamp 11. In other words, the optical axis of headlamp 11 may be adjusted using, for example, support 100 described above.

Moreover, for example, in the above embodiment, automobile 1 is exemplified as a four-wheeled automobile, but automobile 1 may be a different automobile such as a two-wheeled automobile.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting device for use with a mobile object, the lighting device comprising:

a lamp;

a lamp mount for fixing the lamp to the mobile object; and
a support that is shaft shaped and supports the lamp in a predetermined attitude relative to the lamp mount,
wherein the lamp mount has an insertion hole through which the support is to be inserted,
the support includes:
   a male threaded section located at a leading end side in an axial direction and to be inserted into a hole section fixed to the lamp; and
   a trunk section located at a trailing end side in the axial direction and having approximately the same diameter as a diameter of the insertion hole,
the trunk section includes a groove or a through-hole as a communication portion that provides fluid communication from an outer surface on the leading end side to an outer surface on the trailing end side of the trunk section,
the outer surface on the leading end side of the trunk section and the outer surface on the trailing end side of the trunk section each intersect the axial direction,
an opening on a leading end side of the communication portion is provided on the outer surface of the leading end side of the trunk section,
an opening on a trailing end side of the communication portion is provided on the outer surface of the trailing end side of the trunk section, and
the opening on the leading end side of the communication portion and the opening on the trailing end side of the communication portion overlap in a view along the axial direction.

2. The lighting device according to claim 1, wherein the communication portion is the groove formed in a side surface of the trunk section.

3. The lighting device according to claim 1, wherein the support further includes a hook located between the male threaded section and the trunk section, and
the hook does not overlap with the communication portion in an extending direction of the communication portion.

4. The lighting device according to claim 1, wherein the communication portion comprises a plurality of communication portions.

5. The lighting device according to claim 1, wherein in a cross section taken perpendicular to the axial direction, the trunk section has a fan shape that widens from the center outward.

6. The lighting device according to claim 1, wherein the trunk section has, on the leading end side, a surface that inclines toward the communication portion.

7. The lighting device according to claim 1, wherein the communication portion forms, in a surface of the trunk section on the leading end side, an opening having an area of at least 9 mm$^2$.

8. The lighting device according to claim 1, wherein the trunk section includes:
   a first large diameter part having approximately the same diameter as the diameter of the insertion hole;
   a second large diameter part located to the trailing end side of the first large diameter part and having approximately the same diameter as the diameter of the insertion hole; and
   a small diameter part located between the first large diameter part and the second large diameter part and having a smaller diameter than the diameter of the insertion hole, the communication portion includes:
      a first communication portion that communicatively connects the leading end side and the trailing end side of the first large diameter part; and
      a second communication portion that communicatively connects the leading end side and the trailing end side of the second large diameter part, and
   when viewed in the axial direction, the first communication portion and the second communication portion overlap one another.

9. The lighting device according to claim 1, wherein the communication portion is twisted.

10. The lighting device according to claim 9, wherein the trunk section includes:
   a first large diameter part having approximately the same diameter as the diameter of the insertion hole;
   a second large diameter part located to the trailing end side of the first large diameter part and having approximately the same diameter as the diameter of the insertion hole; and
   a small diameter part located between the first large diameter part and the second large diameter part and having a smaller diameter than the diameter of the insertion hole,
the communication portion includes:
   a first communication portion that communicatively connects the leading end side and the trailing end side of the first large diameter part; and
   a second communication portion that communicatively connects the leading end side and the trailing end side of the second large diameter part, and
when viewed in the axial direction, the first communication portion and the second communication portion have no overlap with one another.

11. The lighting device according to claim 1, wherein the support further includes:
   a screw head located at the trailing end side in the axial direction; and
   a tapered hole that decreases in diameter in the axial direction, from the trailing end side of the tapered hole toward the screw head.

12. A mobile object comprising the lighting device according to claim 1.

13. A support for supporting a lamp, the support having a shaft shape and comprising:
   a male threaded section located at a leading end side in an axial direction; and
   a trunk section located at a trailing end side in the axial direction and having a larger diameter than the male threaded section,
   the trunk section including a groove or a through-hole as a communication portion that provides fluid communication from an outer surface on the leading end side to an outer surface on the trailing end side of the trunk section,
   the outer surface on the leading end side of the trunk section and the outer surface on the trailing end side of the trunk section each intersect the axial direction,
   an opening on a leading end side of the communication portion is provided on the outer surface of the leading end side of the trunk section,
   an opening on a trailing end side of the communication portion is provided on the outer surface of the trailing end side of the trunk section, and
   the opening on the leading end side of the communication portion and the opening on the trailing end side of the communication portion overlap in a view along the axial direction.

14. The support according to claim 13, wherein the communication portion is the groove formed in a side surface of the trunk section.

15. The support according to claim 13, wherein the support further includes a hook located between the male threaded section and the trunk section, and the hook does not overlap with the communication portion in an extending direction of the communication portion.

16. The support according to claim 13, wherein the communication portion comprises a plurality of communication portions.

17. The support according to claim 13, wherein the trunk section has, on the leading end side, a surface that inclines toward the communication portion.

18. The support according to claim 13, wherein the communication portion forms, in a surface of the trunk section on the leading end side, an opening having an area of at least 9 mm$^2$.

19. The support according to claim 13, wherein the trunk section includes:
   a first large diameter part having a larger diameter than the male threaded section;
   a second large diameter part located to the trailing end side of the first large diameter part and having approximately the same diameter as the diameter of the first large part; and
   a small diameter part located between the first large diameter part and the second large diameter part and having a smaller diameter than the diameter of the first large part,
the communication portion includes:
   a first communication portion that communicatively connects the leading end side and the trailing end side of the first large diameter part; and
   a second communication portion that communicatively connects the leading end side and the trailing end side of the second large diameter part, and
when viewed in the axial direction, the first communication portion and the second communication portion overlap one another.

20. The support according to claim 13, wherein the communication portion is twisted.

\* \* \* \* \*